(12) United States Patent
Yoon et al.

(10) Patent No.: US 9,929,649 B2
(45) Date of Patent: Mar. 27, 2018

(54) HYBRID CONTROL ARCHITECTURE FOR LOAD-ADAPTIVE POWER CONVERTER

(71) Applicant: THE REGENTS OF THE UNIVERSITY OF MICHIGAN, Ann Arbor, MI (US)

(72) Inventors: Euisik Yoon, Ann Arbor, MI (US); Sung-Yun Park, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 16 days.

(21) Appl. No.: 15/042,406

(22) Filed: Feb. 12, 2016

(65) Prior Publication Data

US 2017/0237348 A1    Aug. 17, 2017

(51) Int. Cl.
*H02M 3/158* (2006.01)
*G05F 1/563* (2006.01)
*H02M 1/00* (2006.01)

(52) U.S. Cl.
CPC ............. *H02M 3/158* (2013.01); *G05F 1/563* (2013.01); *H02M 2001/0054* (2013.01)

(58) Field of Classification Search
CPC ........ H02M 2001/0054; H02M 3/1584; G05F 1/563
See application file for complete search history.

(56) References Cited

U.S. PATENT DOCUMENTS

| | | | |
|---|---|---|---|
| 7,586,767 B1 | 9/2009 | Prodic et al. | |
| 7,928,719 B2 | 4/2011 | Zhang et al. | |
| 2005/0212497 A1* | 9/2005 | Cha | H02M 3/1584 323/272 |
| 2009/0001949 A1* | 1/2009 | Komori | H02M 3/1584 323/272 |
| 2009/0039842 A1* | 2/2009 | Chen | H02M 3/1584 323/272 |
| 2010/0066319 A1* | 3/2010 | Qiu | H02M 3/1584 323/272 |

\* cited by examiner

*Primary Examiner* — Harry Behm
(74) *Attorney, Agent, or Firm* — Harness, Dickey & Pierce, P.L.C.

(57) ABSTRACT

A pulse width modulated power converter is presented with load-adaptive power transistor scaling scheme using analog-digital hybrid control. The coarse digital control generates an approximate duty cycle necessary for driving a given load and selects an appropriate width of power transistors to minimize redundant power dissipation. The fine analog control provides the final tuning of the duty cycle to compensate for the error from the coarse digital control. The mode switching between the analog and digital controls is accomplished by a mode arbiter which estimates the average duty cycle for the given load condition from limit cycle oscillations induced by the coarse adjustments.

16 Claims, 19 Drawing Sheets

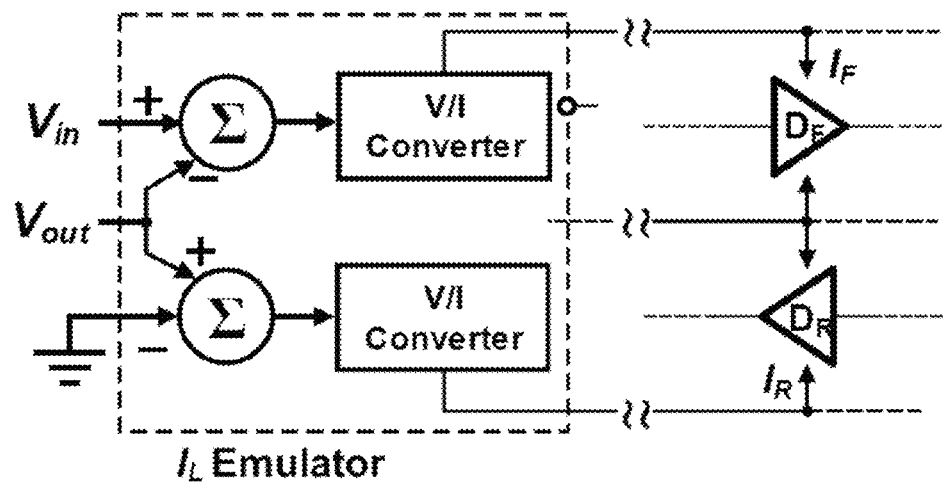
FIG. 8A
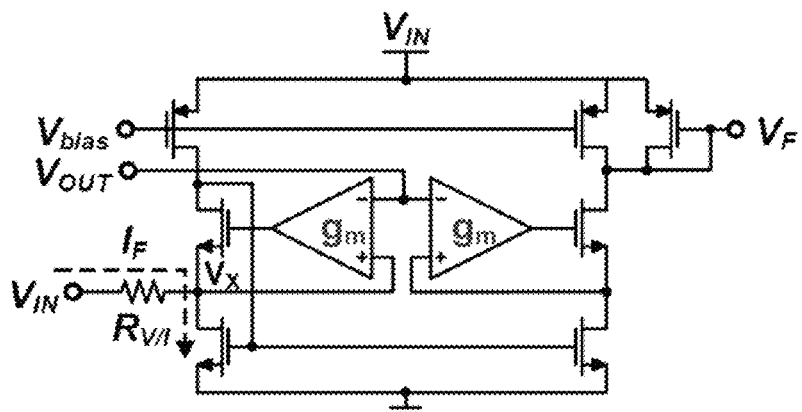
FIG. 8B
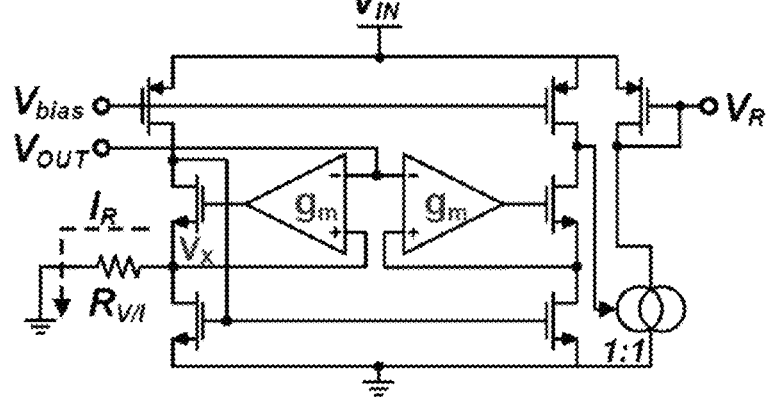

US 9,929,649 B2

HYBRID CONTROL ARCHITECTURE FOR LOAD-ADAPTIVE POWER CONVERTER

FIELD

The present disclosure relates to a hybrid control architecture for load-adaptive power transistor scaling of power converters.

BACKGROUND

The high energy efficiency is one of the most critical requirements for wireless sensors since the systems are usually located in the energy-limited environments and their primary energy sources are limited to only several options: batteries, wireless power transfer methods, or a combination of them. Their lifetime is mostly determined by the battery lifetime, and those systems must be also replaced after a certain time period with the expensive procedures.

The low power techniques to extend the lifetime of those systems mostly depend on the aggressive power supply scaling such as dynamic voltage scaling (DVS) techniques. While the scaled supply makes it possible for the systems to accomplish economic energy usage, the squeezed voltage headroom of the circuits incurs poor power supply rejection ration (PSRR) of the systems. To remedy this problem, linear regulators (linear DC-to-DC converter) are widely employed in the conventional power management of the sensor systems for the stable regulation of power supplies. However, in the battery-powered system the power management with linear regulators fails to secure high power conversion efficiency because they dissipate away the large drop-out voltage resulted from the battery voltage (3~5V) and the required supply (0.5~1.5V). Therefore, other type of power converters should be investigated to exploit the recent low power techniques, and meanwhile guaranteeing high power supply integrity.

In broad sense, the power converter can be divided into two groups: linear power converter (regulator) and switching power converter. The latter is further classified into switched capacitor (SC) converters and inductive power converters. Generally speaking, the switched capacitor power converters can be fully integrated with other circuits on a single chip and show relatively high power conversion efficiency (60-90%). However, they only provide a discrete voltage conversion ratio (VCR, ratio of the output to input voltage) and require complex compensation techniques to generate wide range of VCRs. In the battery operating system which usually requires wide range of VCR, that disadvantage is difficult to overcome. On the other hand, the inductive power converters can provide all possible VCRs in a given topology (for example, buck, boost, fly-back and so on) and exhibit high power conversion efficiency in general. Even though the inductive power converters need several external components (typically 2 external components for basic topologies), it is tolerable for the sensor considering the typical form factor of the systems. Therefore the inductive power converter can be a good candidate instead of linear regulators for the battery-powered sensor systems.

In terms of the operating frequency of the inductive power converters, the controls mechanism of the converters can be further classified into the two different schemes: pulse frequency modulation (PFM) and pulse width modulation (PWM). The PFM power converters can provide high power conversion efficiency (~90%) for wide range of the loads due to their adjustable switching frequency with loading conditions. However, the PFM control has serious shortcomings when combined with power noise-sensitive loads. For instance, the output ripples are larger by the lower switching frequency, which magnifies the impact of switching noise on the load. Moreover, the frequency of the output spurs is a strong function of load current, and therefore their location will vary from a specific operation to another. Thus, predicting their precise location in order to mitigate their impact on the load side becomes extremely difficult. On the other hand, the PWM power converters can provide the stable output with relatively fast transient while exhibiting high power conversion efficiency over medium to high loads. In addition, their output spurs are predictable due to their fixed switching nature, therefore the PWM power converter are able to provide clean supplies once including proper filtering. However, their power conversion efficiency usually suffers at light load condition, in particular less than a few mW that most of the sensor systems consume. In operations, where a few of the signal processing blocks of the systems are the only active parts in the system, low power conversion efficiency is inevitable with the PWM power converters.

For instance, when the power and energy consumption of an implantable biomedical sensors are considered this phenomenon is clearly observed as shown in FIG. 1A where the percentages of power consumptions of the common functional blocks in the implantable biomedical systems are described. Since the analog front-end (AFE) always operates while the other blocks such as data communications and electrical/optical stimulations are active based on the systems request, the operation of the power conversion (dc-to-dc conversion) is mostly dedicated to the low power regions. Therefore high energy efficiency is not able to be achieved if the conventional PWM power converter is adopted for the systems. Moreover, considering the battery life time, the energy consumption should be considered instead of the peak power consumption. Based on the estimated values from FIG. 1A, the daily energy consumption can calculated as shown in FIG. 1B. Even though the AFE only consumes a small fraction of the total power consumption, around 0.97%, it takes about 87% of the total daily energy consumption. Hence, if the power conversion efficiency on low power region is low, the battery life time becomes shorter. In conclusion, it appears that high energy efficiency cannot be achieved if the conventional PWM power converters are employed.

This section provides background information related to the present disclosure which is not necessarily prior art.

SUMMARY

This section provides a general summary of the disclosure, and is not a comprehensive disclosure of its full scope or all of its features.

In one aspect, a power converter system is presented. The power converter system is comprised of a power converter and a controller. The power converter is configured to receive an input voltage and generate an output voltage that supplies a load. The power converter may be comprised of an array of converter circuits coupled in parallel to each other, where each converter circuit includes at least one power transistor that regulates the magnitude of the output voltage. The controller is configured to receive an indicator of the output voltage and is interfaced with each power transistor in the array of converter circuits. The controller selectively controls conductance through the power transistors in the array of converter circuits such that number of power transistors passing current to the load is proportional to magnitude of the load.

In another aspect, the controller is electrically coupled to each power transistor in the array of converter circuits and generates drive signals for each of the power transistors in the array of converter circuits in accordance with one of a coarse control scheme or a fine control scheme. A mode arbiter is configured to receive a signal indicative of the output voltage and determine the magnitude of oscillation in the signal indicative of the output voltage. In response to a determination that the magnitude of oscillation falls outside a predefined variance of the reference voltage, the mode arbiter interacts with the controller to implement the coarse control scheme. In response to a determination that the magnitude of oscillation falls within the predefined variance of the reference voltage, the mode arbiter interacts with the controller to implement the fine control scheme.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 8A and 8B is an example inductor current emulator connected to delay lines and the two V/I converters inside of the emulator, respectively;

Corresponding reference numerals indicate corresponding parts throughout the several views of the drawings.

DETAILED DESCRIPTION

Example embodiments will now be described more fully with reference to the accompanying drawings.

Figure 1A:
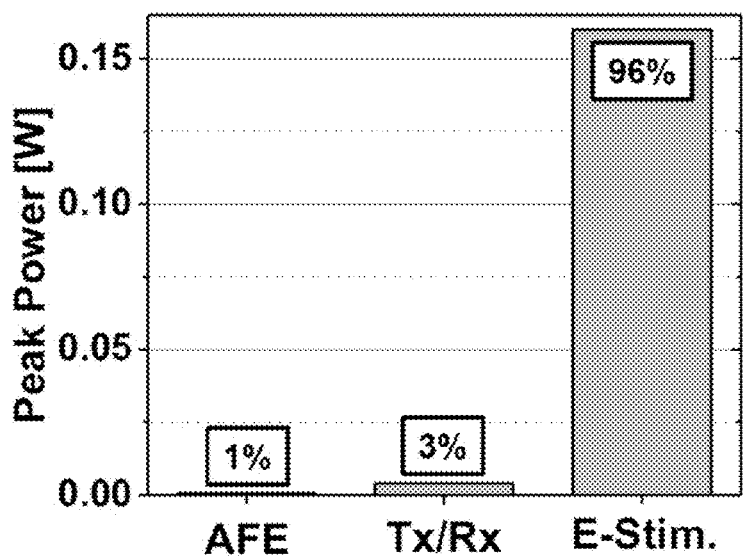
FIGS. 1A and 1B are graphs illustrating peak power consumption and daily energy consumption, respectively, of an implantable biomedical systems.
Figure 1B:
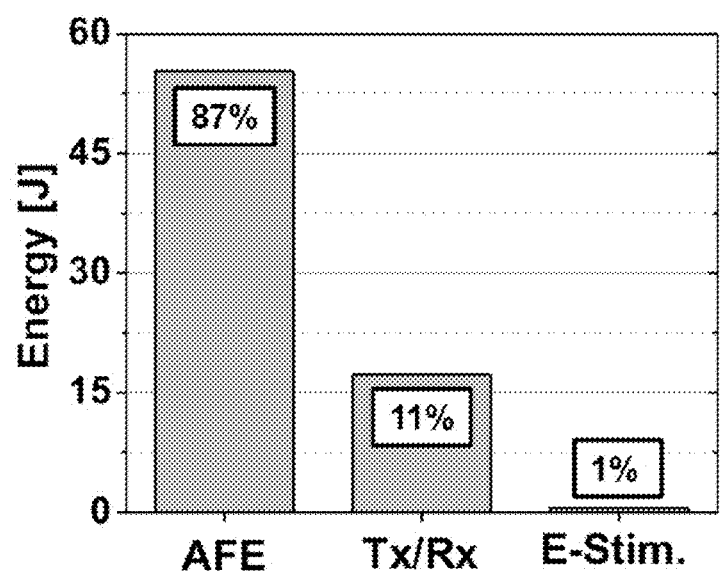
Figure 2A:
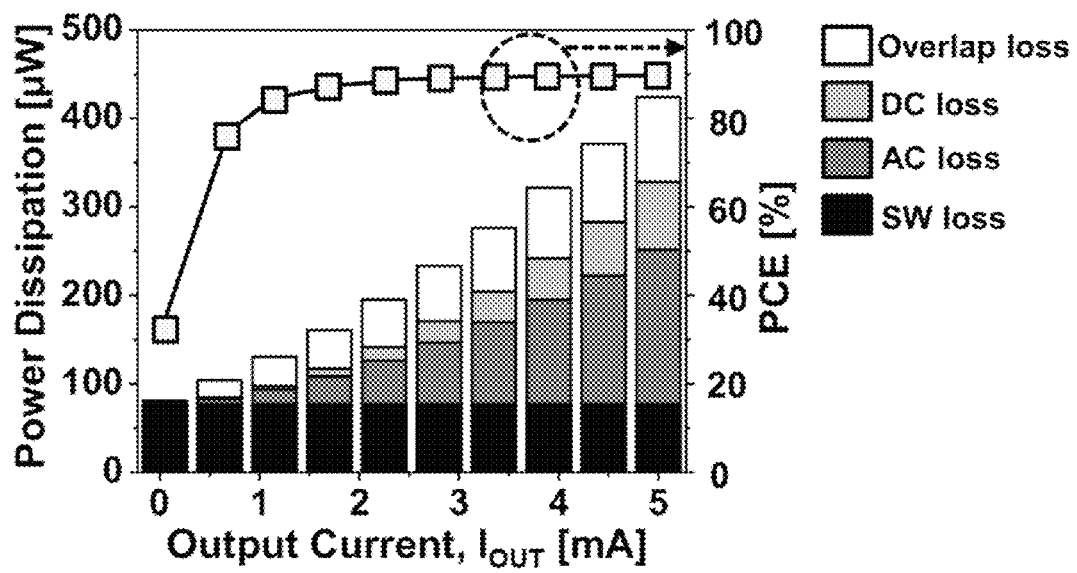
FIG. 2A is a graph illustrating power dissipation of a power converter consisting of a pair of power transistors with size optimal for the maximum load current as shown in FIG. 2B.
Figure 2B:
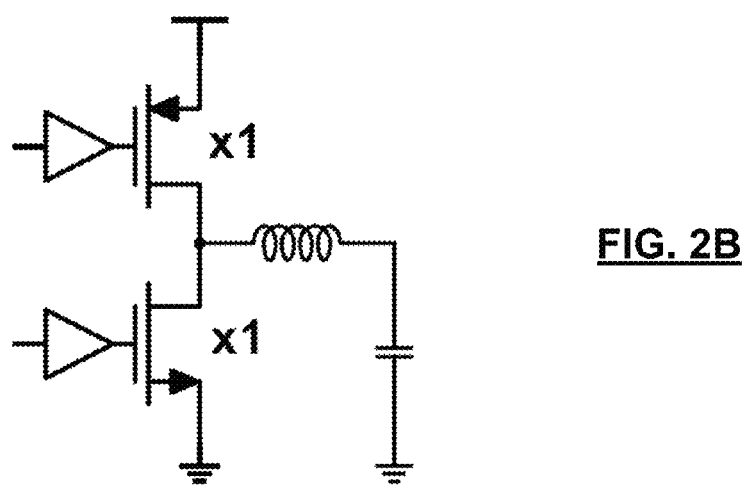

First, different types of power loss related to the loading conditions of a PWM inductive power converter, particularly in a PWM buck converter (step-down converter) are explored as well as how to minimize the dominant power loss to enhance the power conversion efficiency. For this discussion, all design parameters such as switching frequency, values of passives, and sizes of power transistors are assumed to be well-designed to minimize the total power loss of the converter. As the converter's load current varies over its full range, the relative contribution of the different types of power loss varies as well. Without loss of generality, the total power loss can be decomposed into four different categories: AC loss and DC conduction loss coming from Ohmic loss of the power transistors, overlap (OV) loss resulting from the imperfect switching timing of the NMOS and PMOS transistors, and switching (SW) loss dissipated for the charging of the gate capacitances of the power transistors. The four different losses and the total power conversion efficiency with varying load current from 30 μA to 5 mA are illustrated in FIG. 2A for a converter shown in FIG. 2B. For illustration purposes, the converter steps a 3.3V supply down to generate 1 V while operating at 1 MHz fixed switching frequency with a 6.8 μH inductor and 1.2 μF capacitor. The parasitic resistance of the passive components are assumed to be 1Ω. As shown in FIG. 2A, while the overlap loss and AC/DC conduction loss are monotonically increased from 30 μA to 5 mA, the switching loss is independent of the change of the load currents and remains constant (~80 μW) due to the fixed size of the power transistors. Specifically, the switching loss dominates all of the other three losses at less than 1 mA loads, which make this PWM power converter exhibit poor power conversion efficiency at the light load conditions.

In order to improve the power conversion efficiency at such light loads, therefore the switching loss should be reduced without large increase of other losses or additional loss. The switching loss of a power converter is given as $$W_{OPT} \propto \frac{P_{OUT}}{\sqrt{f_{SW}}} = \frac{V_{OUT} \cdot I_{OUT}}{\sqrt{f_{SW}}} \qquad (2)$$

where $P_{OUT}$ and $f_{SW}$ are the output power and switching frequency of the given power converter, respectively. As shown in equation (2), $W_{OPT}$ is proportional to the load current when the operating frequency and the output voltage ($V_{OUT}$) are constant. Another numerical calculation is performed using equation (2) and is illustrated in FIG. 3 where the width of the power transistors is divided amongst a fixed number of units (e.g., 16) but the other conditions except for the width remain the same as in FIG. 2. Even though the AC and DC conduction loss and overlap loss are also affected by the size of the power transistors, their increases are minimal due to the small load currents. On the other hand, as the effective gate capacitance becomes smaller the switching loss is decreased significantly, and correspondingly the overall power conversion efficiency is improved from less than 40% to over 80% even at the extreme light load conditions, 35 µA. Consequently, if one can realize the load-adaptive scaling of the power transistors scheme satisfying equation (2), that is the load-adaptive power gating while consuming small additional power (much less than the switching loss at light loads) and exhibiting low complexity, the overall power conversion efficiency will be enhanced.

Most of the recent works must have the dedicated controllers and sensors to realize load-adaptive power gating. In one example, the parasitic resistance of the inductor and active RC low pass filters are used for the estimation of the current loading condition and accommodates the finites state machine (FSM) to calculate the necessary size of the power transistor. In another example, the dedicated ADC for this purpose was implemented on chip. However, in the proposed architecture, the load-adaptive power gating is realized by reusing the existing blocks without any dedicated sensors and estimators.

Figure 4:
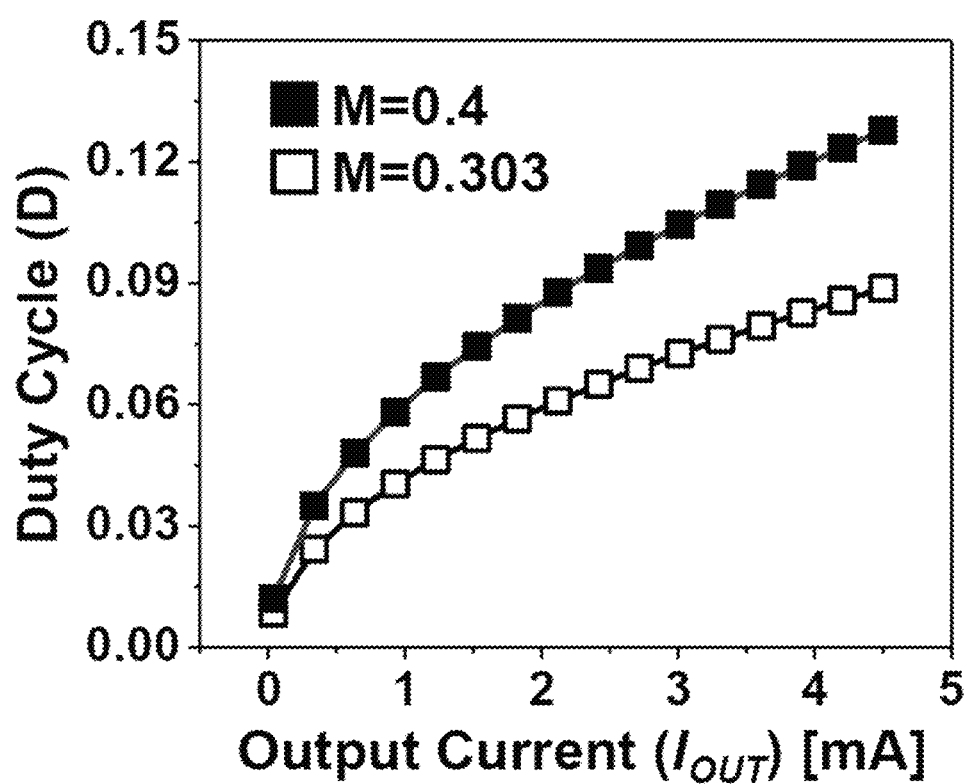
FIG. 4 is a graph illustrating duty cycle for a discontinuous conduction mode buck operation.

With the given design parameters and light load conditions, the PWM power converter operate in discontinuous conduction mode (DCM). In DCM mode of operation, the duty cycle is calculated as follows $$M = \frac{2}{1 + \sqrt{1 + \frac{4K}{D^2}}} \quad (3)$$

where M, K, and D are the VCR, critical value ($K=2Lf_S/R$ and R is load), and duty cycle, respectively. Using equation (3), the required duty cycles for both of two different VCR (0.3 and 0.7, equivalent to $V_{OUT}=1$ V from $V_{IN}=2.5$ and 3.3 V) are shown in FIG. 4. Since the required duty is proportional to the output current (i.e., $I_{OUT}$ in the DCM mode), it can be used for the selection of the number of the power transistors, N. Even though this is not an optimal control following (2) precisely (the ideal case for M=0.7 is indicated by the dashed line in FIG. 4), the additional power loss from the deviation is not significant. For instance, the additional power dissipation at the 35 µA by the deviation from the ideal is calculated as about 1.2 µW which is only 5% of total power dissipation at this load condition. In addition, another advantage of this control comes from the realization of it. The selection of the number of transistor is discrete, thus a digital controller might be favorable. In this case, no digital-to-analog conversion (DAC) which is usually implemented with a power consuming ramp generator in the conventional digitally controlled converters is necessary because the selection of the power transistors itself performs the DAC function.

Figure 5:
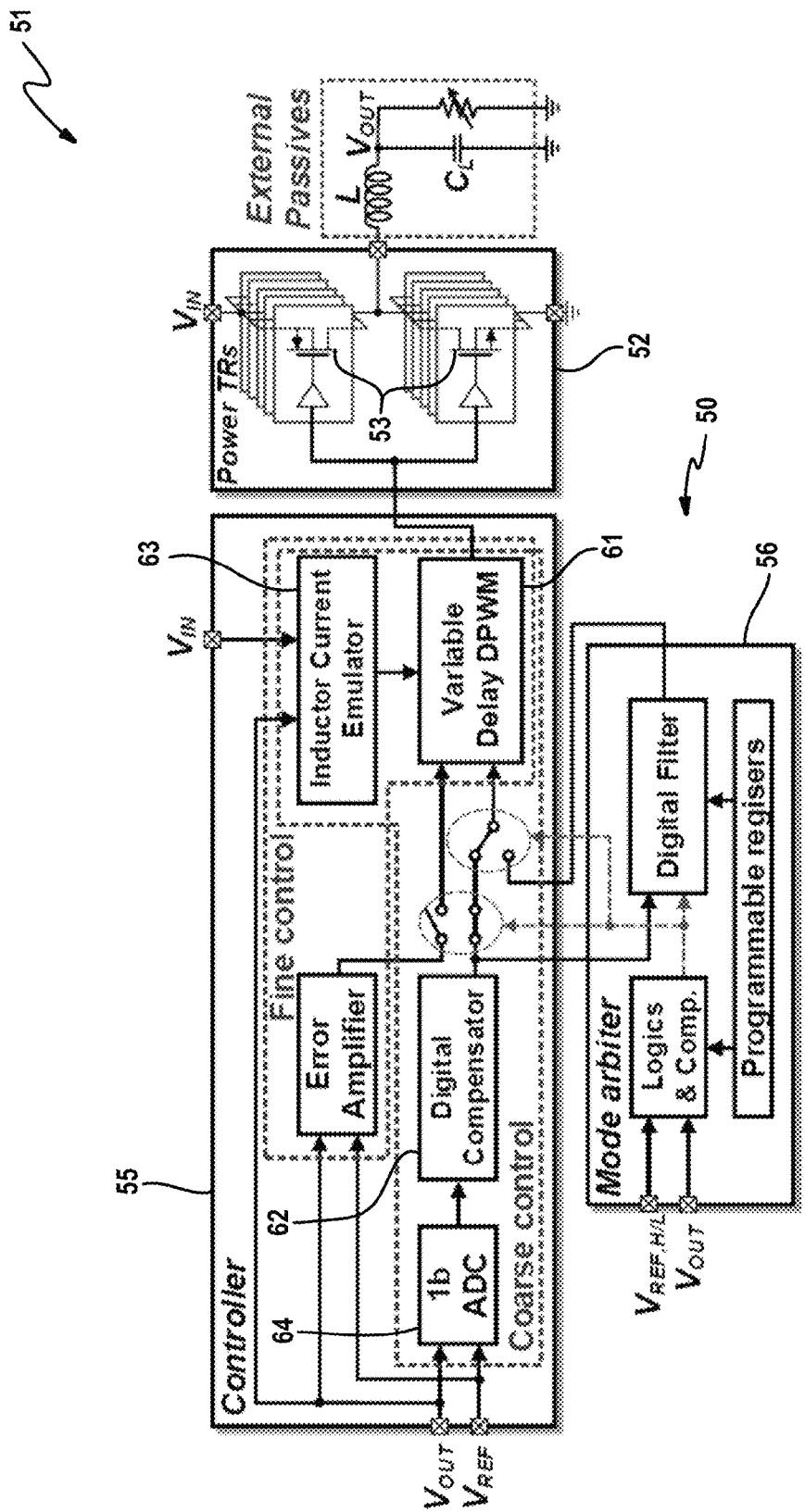
FIG. 5 is a block diagram depicting an example analog-digital hybrid control architecture.

FIG. 5 depicts an example analog-digital hybrid control architecture 50 in the context of a PWM power converter 51. The power converter 51 is configured to receive an input voltage $V_{IN}$ and generate an output voltage $V_{OUT}$ that supplies a load. $V_{REF}$, $V_{REFH}$, and $V_{REFL}$ are the reference voltages as will be further described below. For load-adaptive scaling of the width of the power transistors, the power converter 51 includes an array of converter circuits 52 coupled in parallel to each other and each converter circuit includes at least one power transistor 53 that regulates the magnitude of the output voltage. In the example embodiment, the array of converter circuits 52 is comprised of sixteen (16) unit-sized power transistors although more or less power transistors may be used to form the array.

Figure 6A:
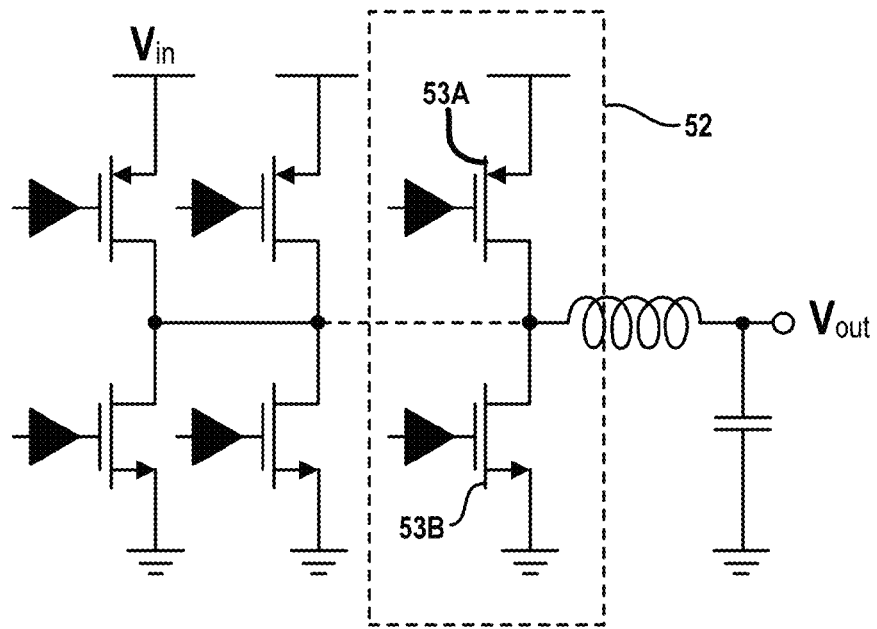
FIGS. 6A and 6B are schematics of a buck converter and a boost converter, respectively.
Figure 6B:
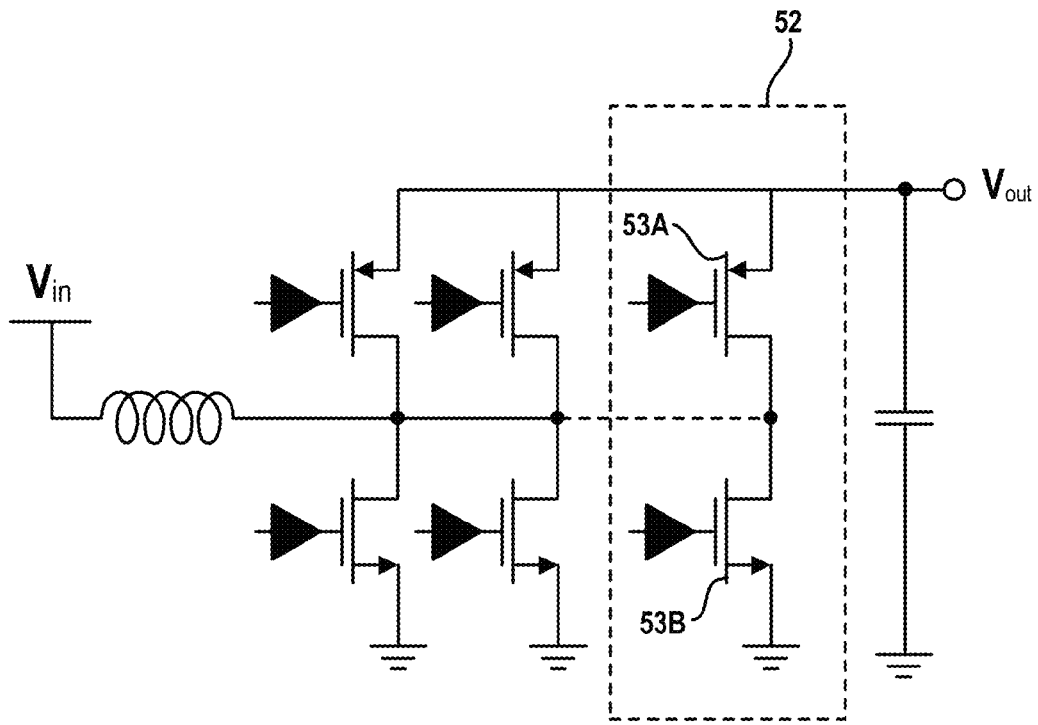

In one embodiment, the power converter 51 is implemented as a buck converter as seen in FIG. 6A. In another embodiment, the power converter 51 is implemented as a boost converter as seen in FIG. 6B. In either case, each converter circuit 52 is formed by a pair of power transistors: an upper transistor 53A with a p-type channel and a lower transistor 53B with an n-type channel, where drain of the upper transistor is electrically coupled at a node to drain of the lower transistor although other arrangements for the converter circuits are contemplated by this disclosure. While reference is made primarily to a buck converter throughout this disclosure, it is readily understood that the proposed control scheme is applicable to a boost converter as well as other types of power converters.

Figure 3A:
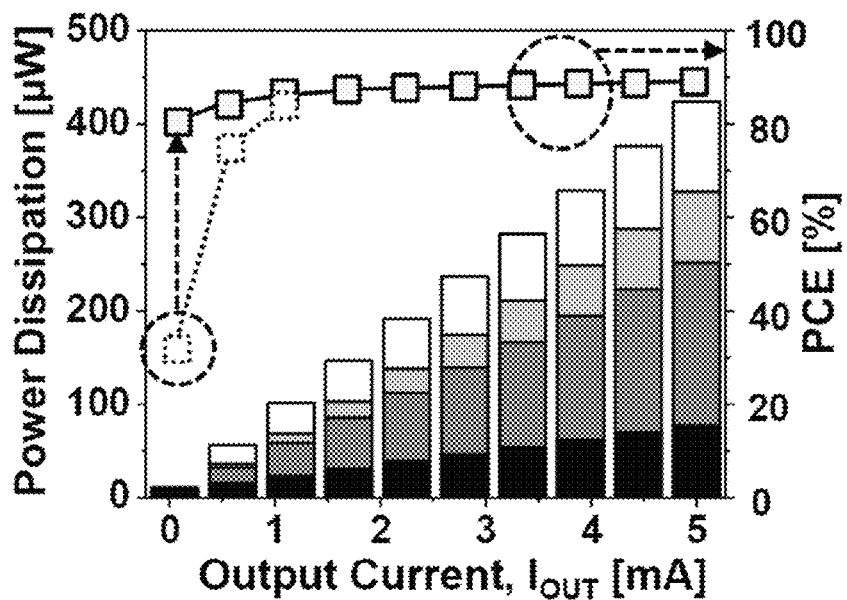
FIG. 3A is a graph illustrating power dissipation of power converter having sixteen pairs of power transistors as shown in FIG. 3B.
Figure 3B:
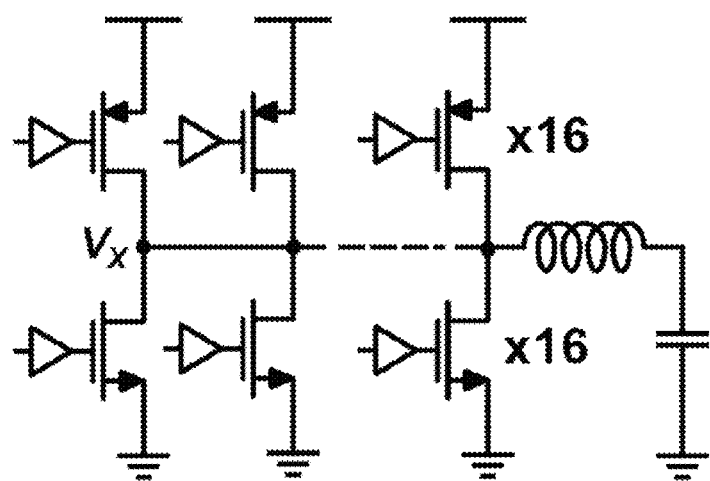

To achieve high power conversion efficiency at light loads, the sizing of the unit power transistor is one of the most important issues in the proposed converter. For the design of the unit-sized power transistors, two major design criteria were considered. First, the sum of the widths of all unit power transistors (the maximum size of the power transistors) was designed by considering the Ohmic loss (AC/DC conduction loss) to be less than half of the total power dissipation at maximum current (4 mA), and consequently the switching loss and overlap loss can occupy the other half of the total allowable power loss. The reason why this standard is set is that the portion of both conduction losses become dominant as the output current increases and reaches more than half of the total power loss as shown in FIG. 3A. Second, once the switching loss is confined into the certain value to guarantee the target power conversion efficiency (>80%) for the minimum load current, the other losses can be ignored because the other loss will be much smaller than the switching loss due to the tiny load current. However, another constant loss comes from the analog blocks should be included in this procedure. To guarantee over 80% efficiency at the lightest load condition (35 µW), the switching loss are set to be less than 5 µW considering 6.5 µW constant power consumption from the analog blocks. When a single PMOS and NMOS power transistor are selected, $C_{TOT}$ (total capacitance at node $V_X$ in FIG. 3B) should be less than 600 fF at $f_{SW}=1$ MHz and $V_{SW}=3.3$ V. The gate capacitance ($C_{GS}$) and overlap capacitance ($C_{GD}$) of a single PMOS and NMOS are 90 fF and 90 fF, and 0.95 fF and 1.2 fF, respectively. Thus, $C_{TOT}$ equals to be 550 fF. For maximum current, the power dissipation from the Ohmic loss (AC/DC conduction loss) becomes about 170 µW by the 1.15 and 0.90 on-resistance of the 120 µm and 75 µm widths of PMOS and NMOS transistors.

With continued reference to FIG. 5, a controller 55 is interfaced with each power transistor 53 in the array of converter circuits 52 and selectively controls conductance through the power transistors in the array of converter circuits 52 such that number of power transistors passing current to the load is proportional to magnitude of the load. During operation, the controller 55 has two different modes: digital (coarse) control and analog (fine) control. The controller 55 generates drive signals for the power transistors in the array of converter circuits 52 in accordance with one of a coarse control scheme or a fine control scheme as will be further described below.

In the digital control mode, overall operation is similar to a conventional digital controller. That is, the controller 55 is configured to receive an indicator of the output voltage, $V_{OUT}$, and determines an error signal by comparing the indicator of the output voltage with a reference voltage $V_{REF}$. The controller 55 in turn determines the number of power transistors passing current to the load in accordance with the error signal. In the example embodiment, the digital control is implemented by a variable-delay digital pulse width modulation (variable delay DPWM) 61, a digital compensator 62, an inductor current emulator 63, and an analog-to-digital converter (ADC) 64 as will be further described below. Other implementations also fall within the broader scope of this disclosure.

In the analog control mode, the overall operation is performed within the error bounds from the coarse digital control while reusing the functional blocks of the digital control. The bounded error from the coarse digital control is amplified and delivered to the variable delay DWPM for the final tuning. Since the converter has two control modes, there should be a functional block to make a decision for which mode should be used.

A mode arbiter 56 governs the control mode. The mode arbiter 56 not only governs the mode of controls but also extract the current control information of the converter based on the limit cycle oscillations (LCO) from the over-simplified digital control. On the whole, LCOs are the phenomena which should be avoided for the stable output control. The LCOs, however, are exploited for the control of the converter in the proposed architecture.

During operation, the mode arbiter 56 is configured to receive a signal indicative of the output voltage and extract information regarding the load using the oscillation in the signal indicative of the output voltage. More specifically, the mode arbiter 56 monitors the magnitude of oscillation. In response to a determination that the magnitude of oscillation falls outside the predefined variance of the reference voltage, the mode arbiter 56 interacts with the controller 55 to implement the coarse control scheme. In response to a determination that the magnitude of oscillation falls within a predefined variance of the reference voltage, the mode arbiter 56 interacts with the controller 55 to implement the fine control scheme. The arbitration scheme is described in further detail below.

Figure 7:
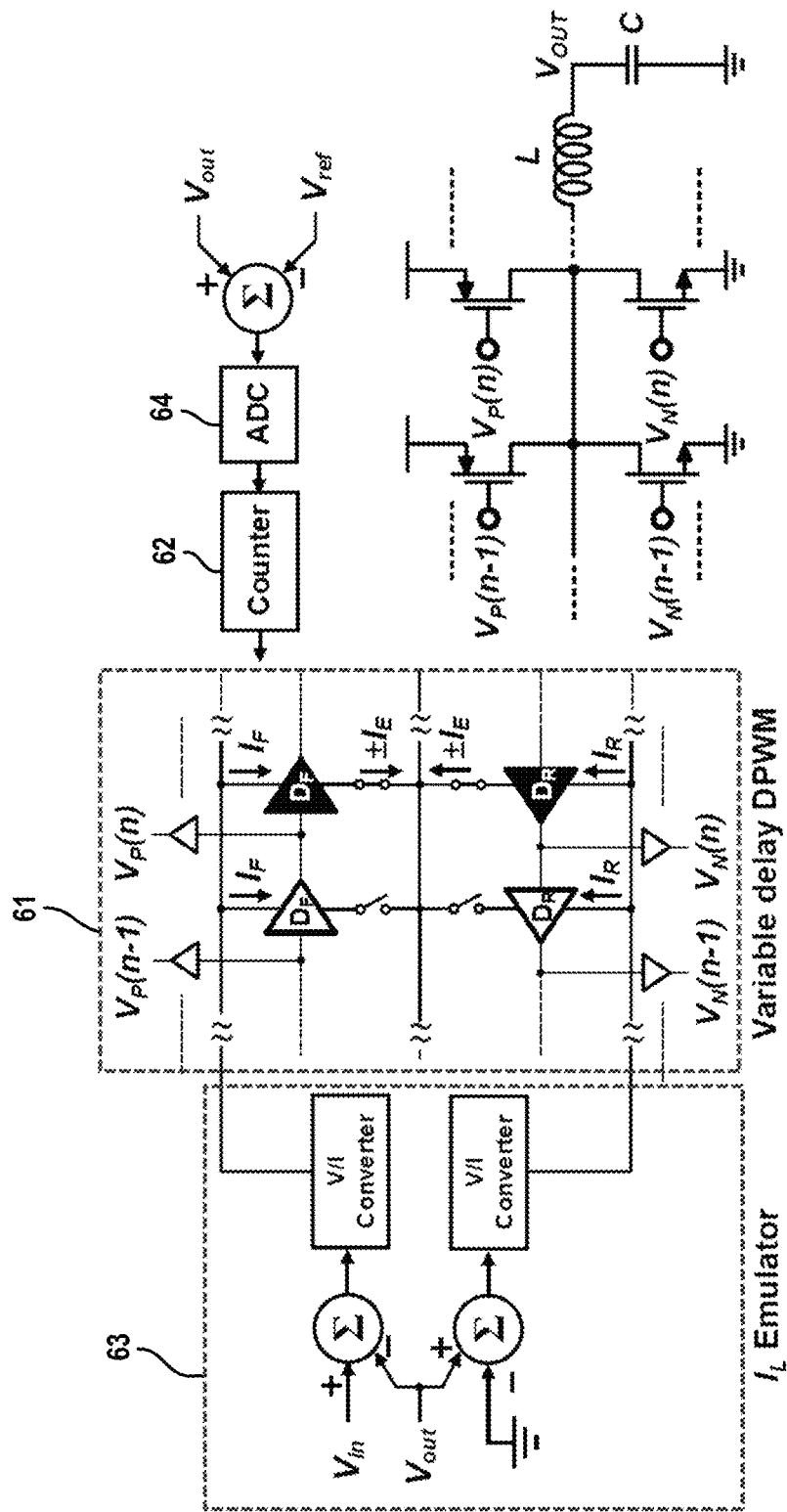
FIG. 7 is a block diagram depicting the coarse digital control scheme.

FIG. 7 further illustrates the coarse digital control scheme. The error voltage between the target output ($V_{REF}$) and the actual output ($V_{OUT}$) is quantized by a 1b-ADC 64 and integrated through a 16b-counter 62 to control the number of delay cells in the DPWM block 61. The variable delay DPWM block 61 consists of an array of delay lines and unit-sized NMOS and PMOS drivers, which will be turned on or off based upon the output of the counter 62. The counter 62 estimates the necessary duty cycle (D) with the given load. The PMOS and NMOS driving signals are denoted as $V_P$ and $V_N$, respectively, in FIG. 7. The variable delay DPWM 61 can adaptively perform power gating by choosing the necessary amount of unit-size transistor pairs for a specific load condition without requiring any additional control blocks. The forward and reverse delay cells, $D_F$ and $D_R$, in the DPWM 61 are controlled by the inductor current emulator block 63 ($I_L$ emulator) where the driving current, $I_F$ and $I_R$, are generated for the delay cells. In nominal 3.3 V input and 1 V output, $D_F$ and $D_R$ are 4.5 ns and 16.5 ns, respectively.

The $I_L$ emulator 63 performs two functions. First, it provides necessary current for the variable-delay DPWM 61 in accordance with the input supply variation from 2.5-3.3 V. As shown in FIG. 8A, the $I_L$ emulator 61 consists of two voltage-to-current (V/I) converters that generate driving currents for the variable-delay DPWM, $I_F$ and $I_R$, using $V_{IN}$-$V_{OUT}$ and $V_{OUT}$, respectively. The schematics of the two V/I converters are also depicted in FIG. 8B. The generated $I_F$ and $I_R$ are copied and transferred to the forward and reverse delay lines in the variable-delay DPWM block. $V_F$ and $V_R$ in FIG. 8B are the nodes that connected to the forward and reverse delay cells in the variable-delay DPWM 61. Since the delays are inversely proportional to the input current ($I_F$ and $I_R$), $D_F$ and $D_R$ will be also inversely proportional to $V_{IN}$-$V_{OUT}$ and $V_{OUT}$, respectively (I is proportional to V in the V/I converters). According to the equation (3), the necessary duty cycle (D) should increase when the input supply ($V_{IN}$) decreases with the given $V_{OUT}$. In the $I_L$ emulator, once $V_{IN}$ decreases, $I_F$ will decrease, and thus $D_F$ will also increase accordingly. $D_R$ is changed by $V_{OUT}$ with the similar principle with $D_F$. This is how the coarse digital control can adapt its operation for input supply variation.

The other function that the IL emulator 63 provides is indirect zero current detection (ZCD). The ratio of $D_F$ to $D_R$ is critical in order to prevent the reverse $I_L$ generation which may occur in the DCM operation. In the DCM with synchronous design, it is mandatory to implement the ZCD function for detection and elimination of any possible generation of reverse inductor current, especially for low power operation. In the proposed architecture, the necessary condition for ZCD is satisfied simply by generating $D_F$ and $D_R$ according to equation (4). For perfect ZCD in a buck converter, equation (4) below should be met where $D_1$ and $D_2$ are on-times of PMOS and NMOS transistors, respectively, and L is the inductance.

$$\frac{V_{OUT} - V_{IN}}{L} D_1 = \frac{V_{OUT}}{L} D_2 \qquad (4)$$

As shown in FIG. 8B, the driving currents, $I_F$ are $I_R$, for the forward and reverse delays are formed through the two transconductors having $V_{IN}$, $V_{OUT}$, and GND as their inputs in a way that $I_F$ and $I_R$ are proportional to $V_{IN}$-$V_{OUT}$ and $V_{OUT}$, respectively. Since the delays are inversely proportional to the driving current, $D_F$ and $D_R$ are also inversely proportional to $V_{IN}$-$V_{OUT}$ and $V_{OUT}$, respectively. Consequently, the condition of equation (4) is satisfied because the total delays in forward and reverse propagation ($D_1$ and $D_2$) are $nD_F$ and $nD_R$, respectively, when n is assumed to be the selected delay cells. Thus, the ZCD function can be automatically achieved. In nominal condition, where $V_{IN}$=3.3 V and $V_{OUT}$=1 V, the ratio of $D_1$ to $D_2$ is 2.3 in an ideal case. In the proposed design, this ratio is close to the ideal value, by generating adequate delays in $D_F$ and $D_R$.

Figure 9A:
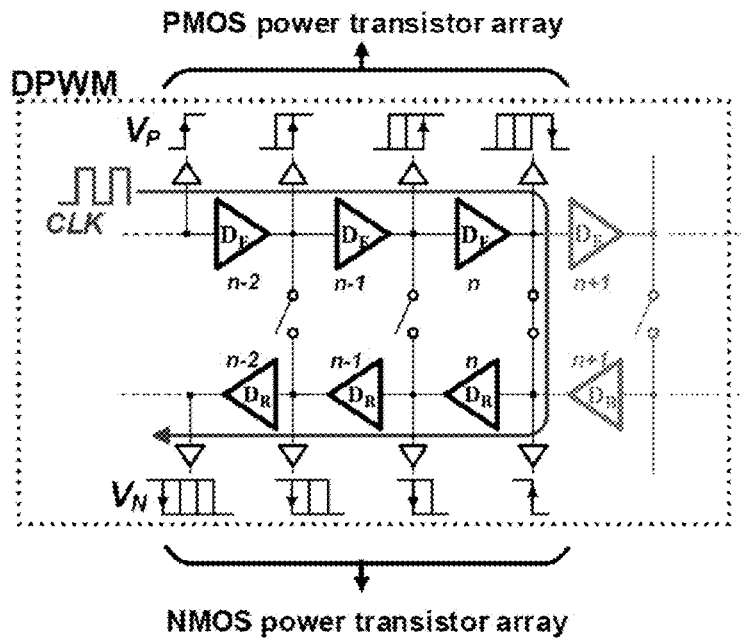
FIGS. 9A and 9B depict the operation of the proposed coarse digital control and the corresponding waveforms, respectively.
Figure 9B:
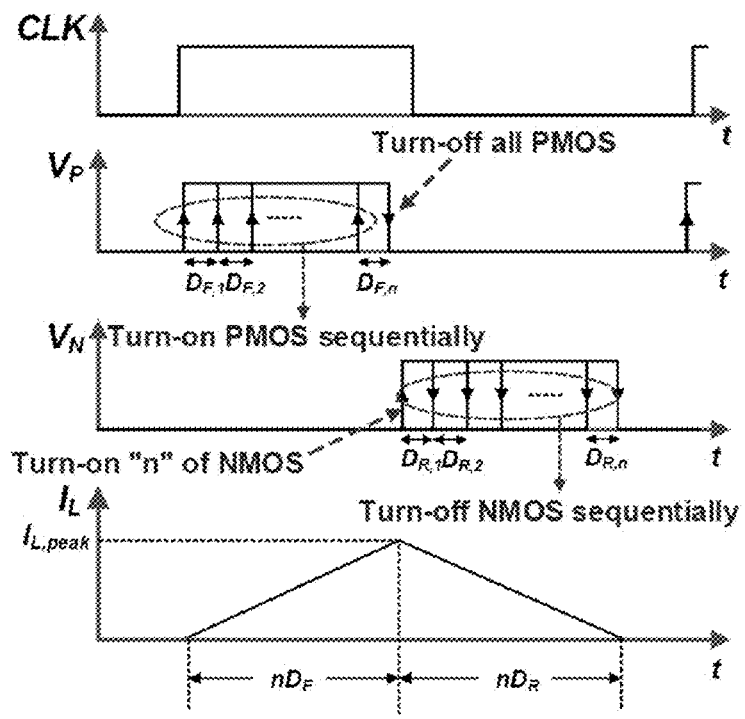
Figure 10A:
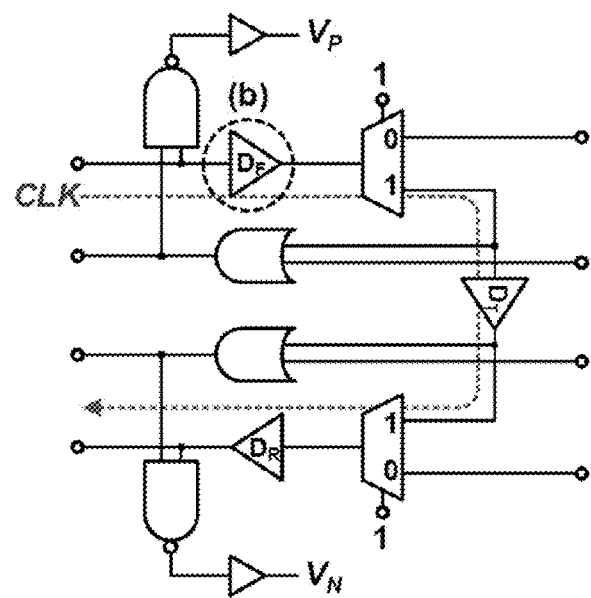
FIGS. 10A and 10B depict a single tap circuit diagram of the variable delay DPWM and a schematic of a single delay cell, respectively.
Figure 10B:
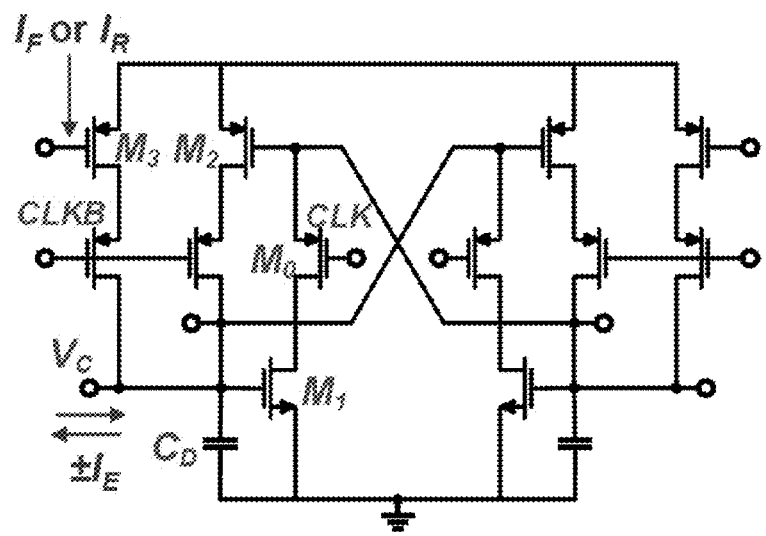

The operation of the coarse digital control is conceptually shown in FIG. 9A. If 'n' is assumed to be a calculated value from the counter, the clock (CLK) propagates toward the n-th tap of the forward delay ($D_F$ delay line from left to right), turning on the unit-sized PMOS power transistors sequentially. Once CLK reaches to the n-th tap, it turns off all the turned-on PMOS power transistors at once, then CLK propagates backward to the starting point. At the beginning of backward traveling, the 'n' number of NMOS power transistors are turned-on at once and then turned off sequentially while the clock is travelling through the $D_R$ delay line. FIG. 9B depicts the corresponding waveforms of CLK, PMOS and NMOS transistor driving signals ($V_P$, $V_N$), and inductor current ($I_L$). As the rising edge of CLK arrives, each VP goes to logic 'H' one by one, turning on the PMOS transistors sequentially. As a result, IL increases monotonically as in FIG. 9B. Once CLK reaches to the designated tap (n-th tap), all $V_P$ signals go back to logic L, and all $V_N$ signals are switched to logic 'H' after a fixed dead-time (the dead time is not shown in FIG. 9). As CLK travels back, each $V_N$ goes back to logic 1' one by one, turning off the NMOS transistors. As a result, $I_L$ decreases as CLK propagates backward. In the example embodiment, the variable-delay DPWM block consists of 16 pairs of delay cells of $D_F$ and $D_R$ and logics that do not consume static power. FIG. 10A shows the circuit implementation of a single delay tap including single forward/reverse delay cell and logics. It is noted that CLK propagation path with the dotted line assuming the tap is selected by the counter. The delay cell (shown in FIG. 10B) has a fully-differential CMOS thyristor adopted, for example from * insert cite *. The differential delay cell provides fast state flipping due to positive feedback from $M_1$ and $M_2$ when asserted by CLK signals. This guarantees robust operation as to any supply voltage variation; the delay cells are not affected by the supply variation and delays ($D_F$ and $D_R$) are only controlled by $I_L$ emulator. The delay varies less than 5% for the nominal input voltage at 3.3 V. The transistor M3 provides the reference current ($I_F$ or $I_R$) and the additional current can be added or subtracted at node $V_c$ to adjust the delay (also denoted as $I_E$ in FIG. 10B). At 3.3V nominal supply voltage, $D_F$, $D_R$, and $D_T$ are 6.5 ns, 14.5 ns, and 2 ns, respectively. The single delay cell consumes about 0.5 μW at 3.3 V with 1 MHz clock.

Figure 11:
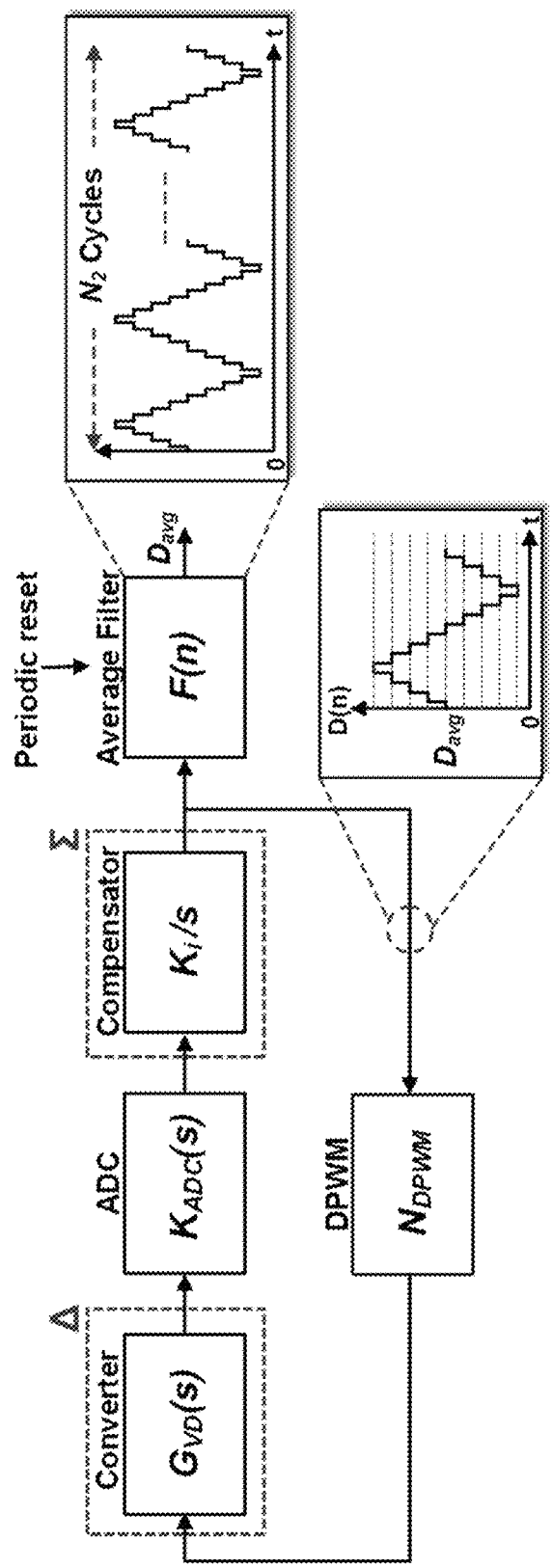
FIG. 11 is a functional block diagram of the coarse digital control scheme.

One of important requirements in digitally controlled power converters is that it should provide minimal oscillation in the output voltage around $V_{REF}$ in steady state. Those oscillations are generated by nonlinear quantization effects in ADC and/or DPWM. Generally speaking, when the resolution of DPWM is not high enough, as compared to that of the ADC, the quantized DPWM output cannot provide steady-state output. This is known as limit cycle oscillation (LCO). In the proposed scheme, LCOs come from the coarse digital control; i.e., the 1b-ADC toggles and thus gives no steady state condition. Although undesirable for steady-state operation, the LCO contains useful information for controlling the system. For example, the amplitude and frequency of LCOs can be extracted and used to tune the coefficient of the proportional-integral-derivative (PID) controller. In the proposed architecture, the average duty ($D_{avg}$) is extracted from the oscillation at $V_{OUT}$ and used for analog fine-tuning control. The digital control block can be modeled as a 1st-order 1-bit incremental ΔΣ modulator as shown in FIG. 11, where Δ modulation is performed in the power converter itself and Σ modulation is accomplished in the digital counter (compensator). A filter block, F(n), takes outputs from the counter and gives the average (Davg). The output of F(n) provides the estimated duty necessary for control. If enough time is allowed for calculation of $D_{avg}$, the resolution (N) of $D_{avg}$ can be given by (5) where M is the number of data points to be used for average calculation.

$$N = \log_2 M \quad (5)$$

Figure 12A:
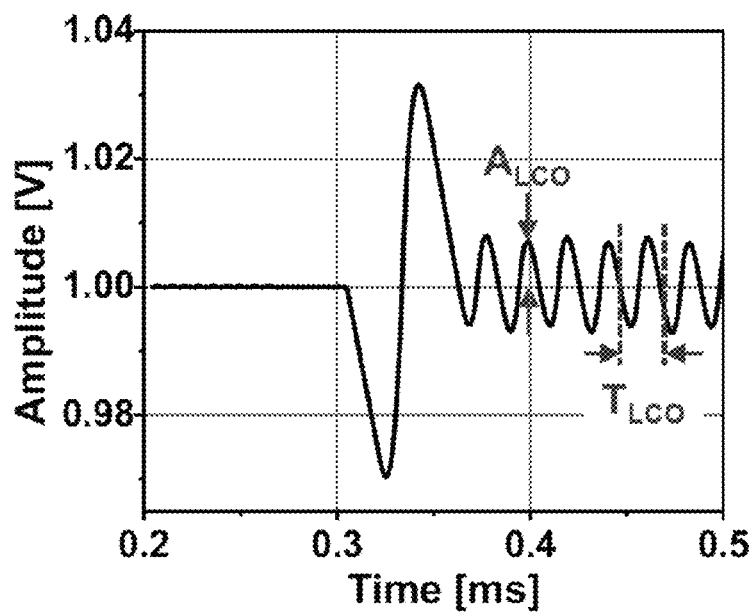
FIGS. 12A and 12B are graphs depicting a typical waveform of limit cycle oscillations and the extracted absolute amplitude, respectively.
Figure 12B:
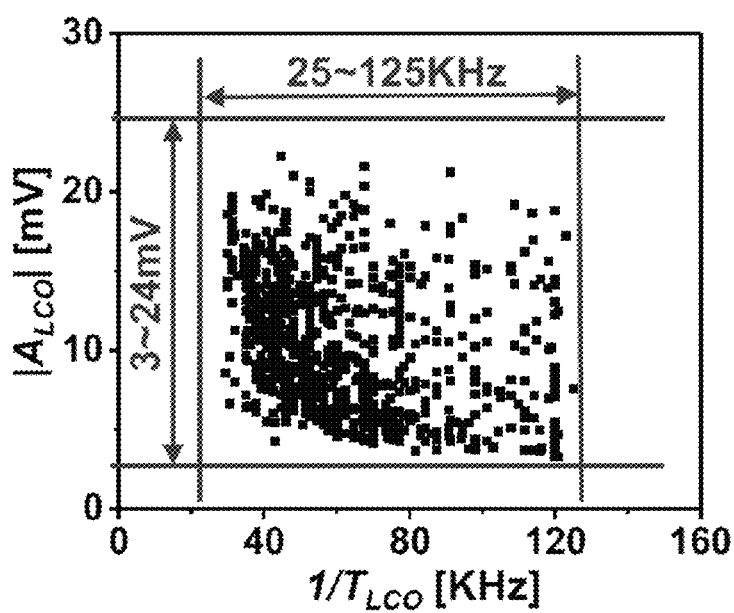

In order to calculate $D_{avg}$ with enough resolution (enough number of data points, M), the frequency of LCOs should be known in advance. In addition, the amplitude information of LCOs should be provided in order to capture them. Unfortunately, the analytical equation for LCOs is hard to get and presumes the assumption of sinusoidal waveforms since LCOs are usually non-sinusoids. Instead of analytical description, numerical simulations were performed to extract the characteristics of LCOs for the given design parameters such as $V_{IN}$, $V_{OUT}$, $f_{SW}$, L, and C. FIG. 12A shows a typical waveform of LCOs, while FIG. 12B shows the extracted absolute amplitude ($|A_{LCO}|$) and period ($T_{LCO}$) for various load current conditions from 30 μA to 5 mA. As shown in FIG. 12B, the amplitude and frequency of LCOs are bounded within 3~24 mV and 25~125 KHz, respectively, with the given load specifications. From the known $T_{LCO}$, M can be set at 96-480 points for calculation of $D_{avg}$. This guarantees the resolution of $D_{avg}$ to be at least 6.5 bit. The estimated $|A_{LCO}|$ can be used to distinguish the onset of LCOs from other typical transient responses of $V_{OUT}$. This is important for reliable operation of the mode arbiter.

Figure 13:
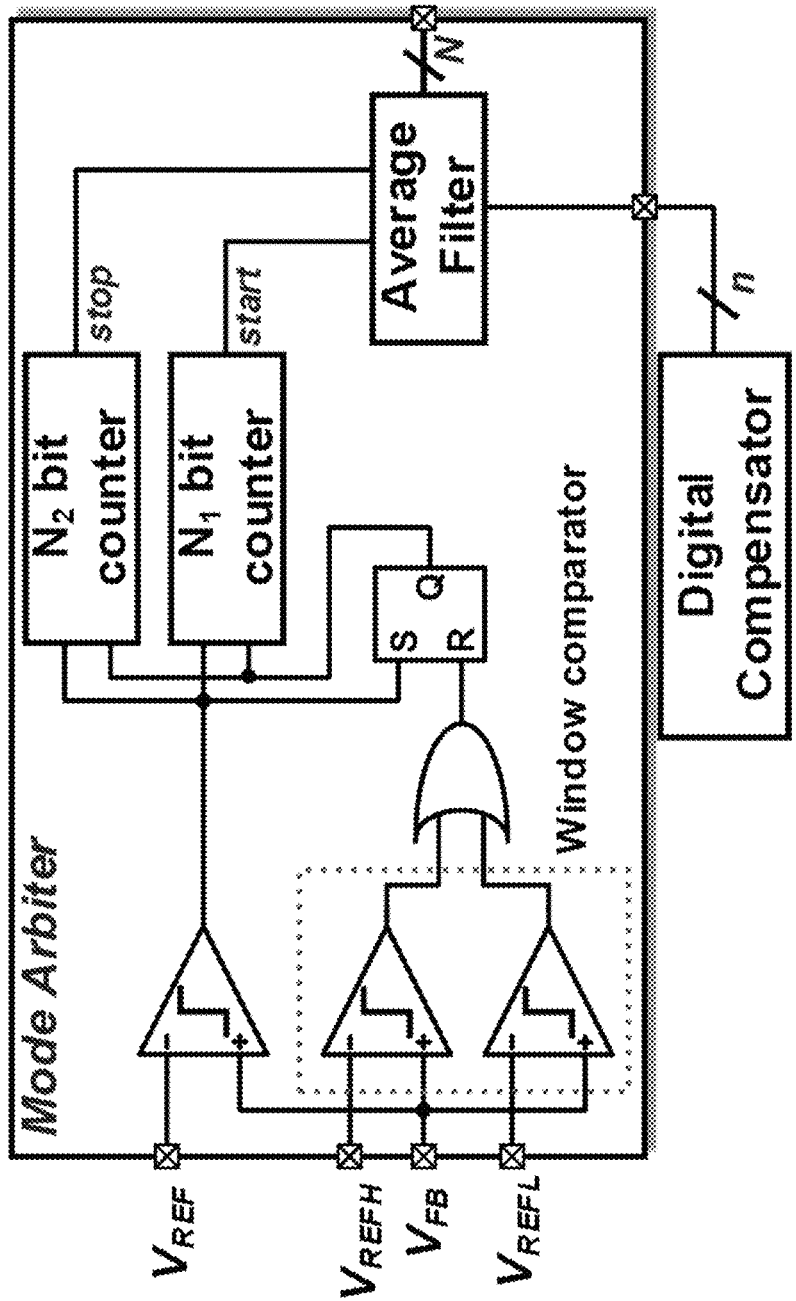
FIG. 13 is a schematic of an example implementation of the mode arbiter.
Figure 14A:
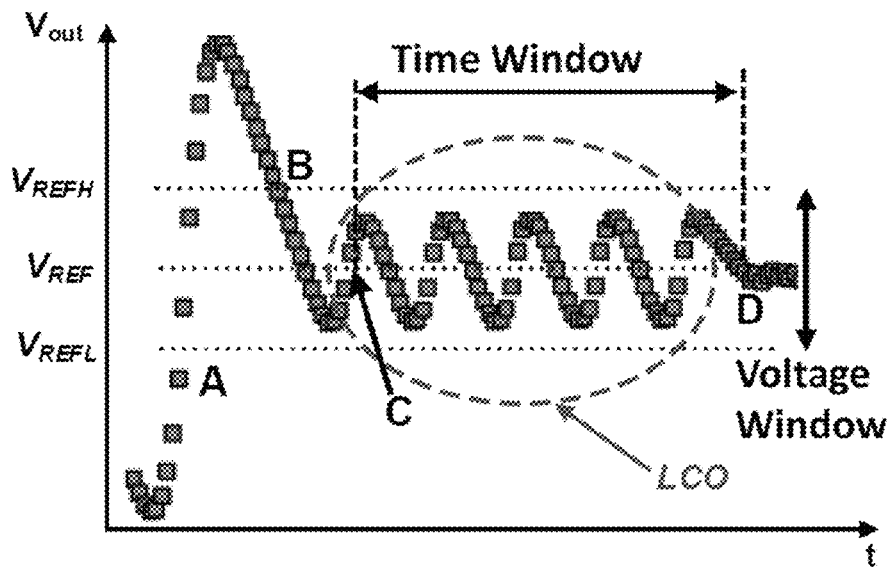
FIGS. 14A and 14B illustrate operation sequence and phase diagram of the mode arbiter, respectively.
Figure 14B:
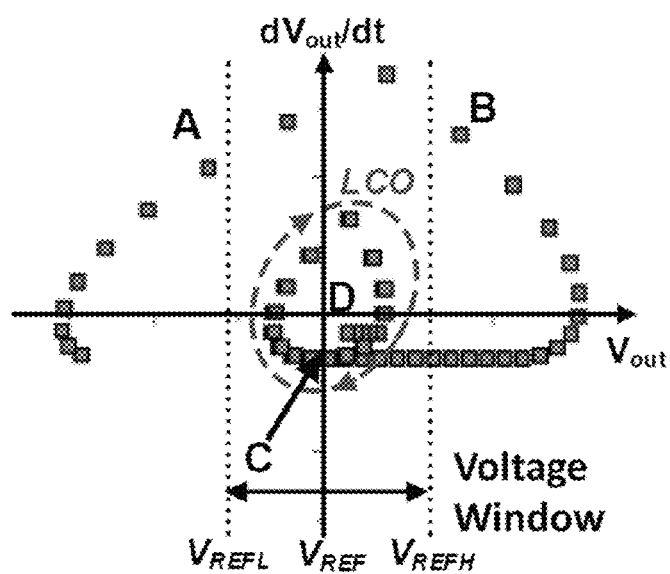

FIG. 13 depicts an example embodiment for the mode arbiter 56. The mode arbiter 56 governs the transition between the coarse digital control and the fine-tuning analog control, and provides $D_{avg}$. Based on the extracted $|A_{LCO}|$ and $T_{LCO}$, the time window is set to be up to 480 μs (typically set <200μ), and the voltage window to observe and calculate $D_{avg}$ from LCOs is set to be 100 mV, respectively. These parameters may vary in other embodiments. When the output converges to the designated voltage window ($V_{REFH}$–$V_{REFL}$), $N_1$-bit counter starts counting the number of zero-crossings of the output. Until the number of zero-crossings reaches a threshold, the average filter is inactive by stop command from the $N_1$-bit counter and waits for stabilization of LCOs. After zero crossings are more than $N_1$ times, the average filter is initiated and takes the output of the digital compensator, n, and generates $D_{avg}$ (N) during $N_2$–$N_1$ counts. FIGS. 14A and 14B conceptually illustrate the operation of the mode arbiter 56. When the output stays outside the voltage window (from A to B in FIG. 14A), the two counters are frozen. After the output converges into the window, the $N_1$- and $N_2$-bit counters start counting up to their values. The average filter starts calculating from C and stops at D. At D, the duty cycle is fixed into 'N' from the average filter and then the analog fine control is initiated. For flexibility of operation, $N_1$ and $N_2$ are programmable to be 2~4 and 6~12, respectively.

Figure 15:
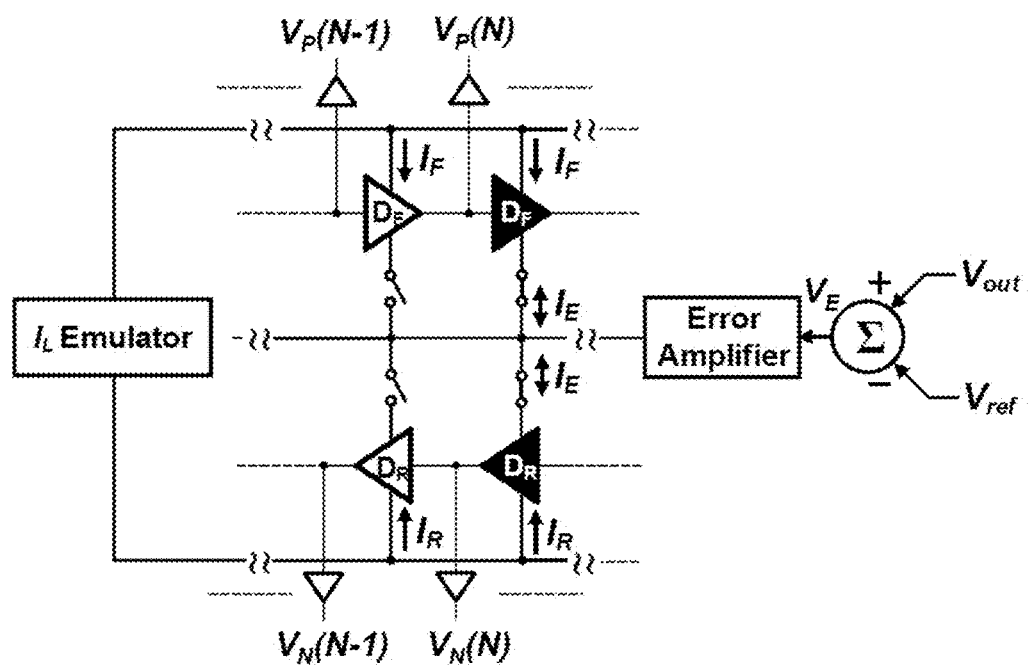
FIG. 15 is a block diagram depicting the analog fine control scheme.
Figures 16A, 16B:
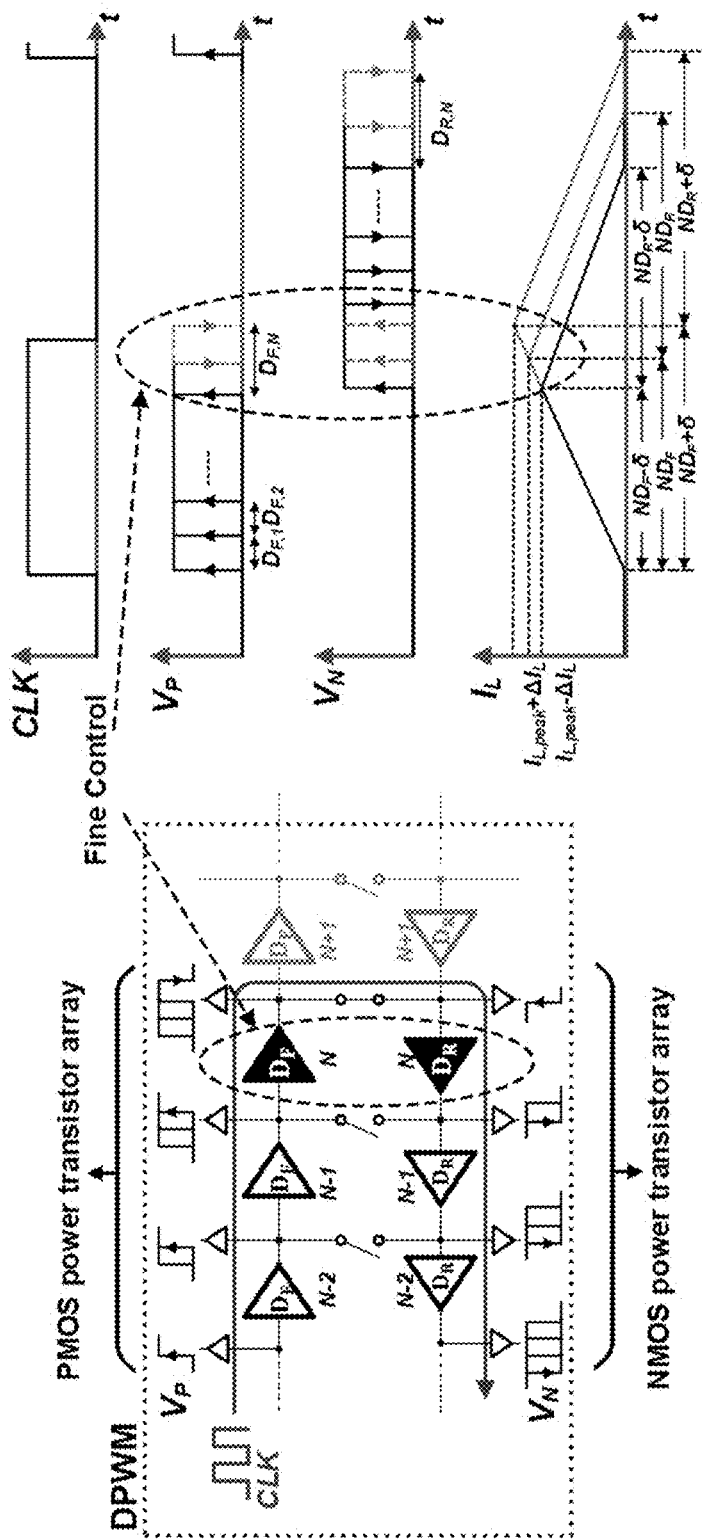
FIGS. 16A and 16B depict the operation of the proposed fine control and the corresponding waveforms, respectively.
Figure 17A:
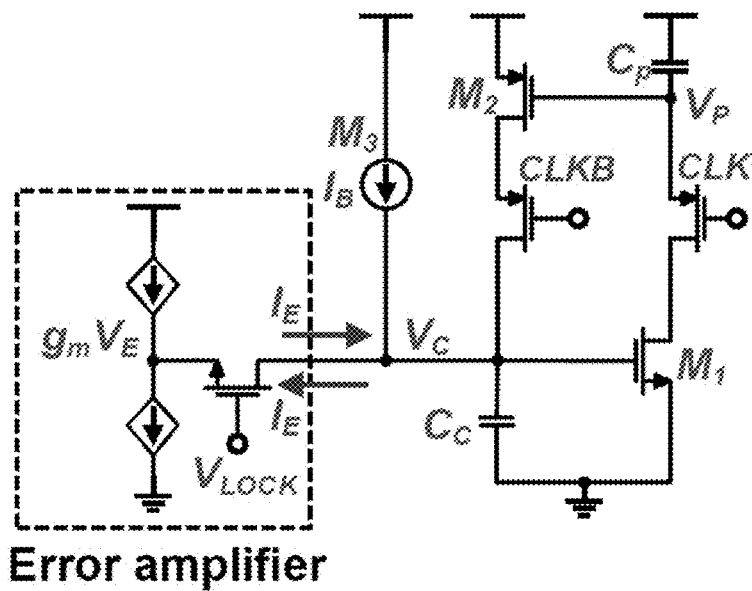
FIGS. 17A and 17B depict the half circuit of the delay cell located inside the last tap of the variable delay DPWM and the variation of delay by adjusting $I_E$.
Figure 17B:
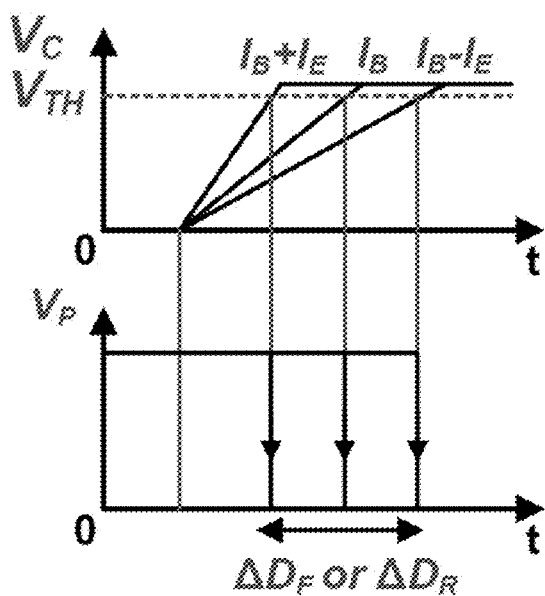

Once the mode arbiter 56 estimates $D_{avg}$ (N), the operation of ADC and variable delay DPWM are frozen, and the analog control is initiated for fine adjustment. FIG. 15 shows the block diagram for the analog fine-tuning control. In this mode, the finite error ($V_E$) is amplified and converted into error current ($I_E$) through the error amplifier (transconductor, $g_m$). $I_E$ is added/subtracted from $I_F$ and $I_R$, which are generated by the $I_L$ emulator, to adjust an appropriate delay in the last tap. Thus, the forward and reverse delays in the last tap are inversely proportional to $I_F \pm I_E$ and $I_R \pm I_E$, respectively. The dynamic range of delays in the last tap is designed as ±1.5 $D_F$ and ±1.5 $D_R$ to fully cover the error from the coarse digital control as well as the rounding error occurred in the digital average filter. FIG. 16A shows the operation of the analog fine control. CLK propagates back and forth through 'N' taps in the same way as for the coarse digital control during the transient mode. FIG. 16B also illustrates the waveforms of CLK, $V_P$, $V_N$, and $I_L$. The difference in operation from the coarse digital control is that only the delay of the last (N-th) tap is adjusted not only by the $I_L$ emulator 63 but also by VE. Consequently $I_L$ is changed to $I_L \pm \Delta I_L$ to compensate the error voltage of $V_E$. FIG. 17A shows the half circuit of a delay cell (the half circuit of FIG. 10B) where $D_F$ or $D_R$ is modulated by $V_E$. Output of the error amplifier is expressed as transconductance ($g_m$) times $V_E$, or $g_m V_E$. After the mode arbiter finishes its estimation of $D_{avg}$, it generates $V_{LOCK}$ to connect the error amplifier to the last tap. Then, the delay is adjusted by $I_E$ to compensate for $V_E$, as shown in FIG. 17B.

In an example embodiment, the proposed PWM converter was fabricated in 0.18 μm standard CMOS processes with 1P6M. The chip is implemented in a core area of 1250 μm×300 μm, or 0.375 mm2, using only 3.3V I/O transistors. The converter operates at 1 MHz frequency and the nominal $V_{OUT}$ is 1 V. Majority of the silicon area is occupied by the implementation of an array of power transistors and their gate drivers.

Figure 18:
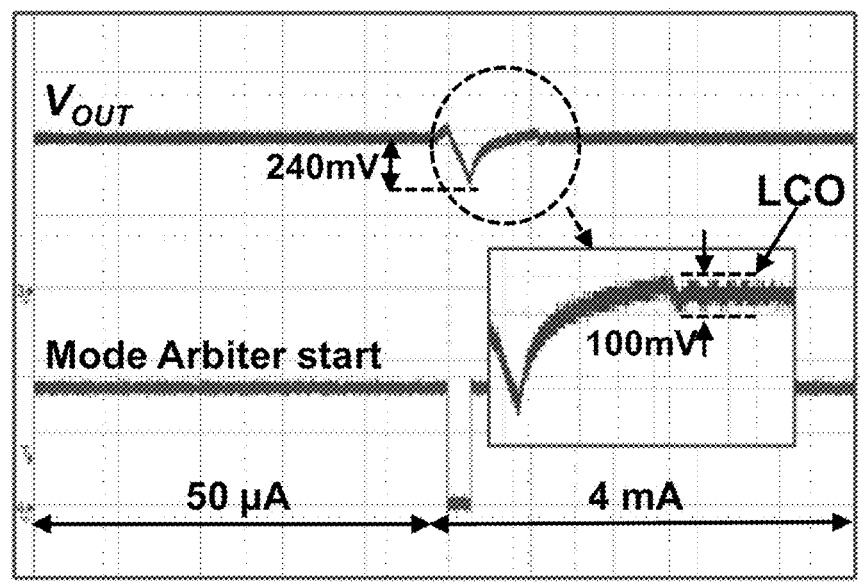
FIG. 18 is a graph illustrating transient response for load current change.
Figure 19:
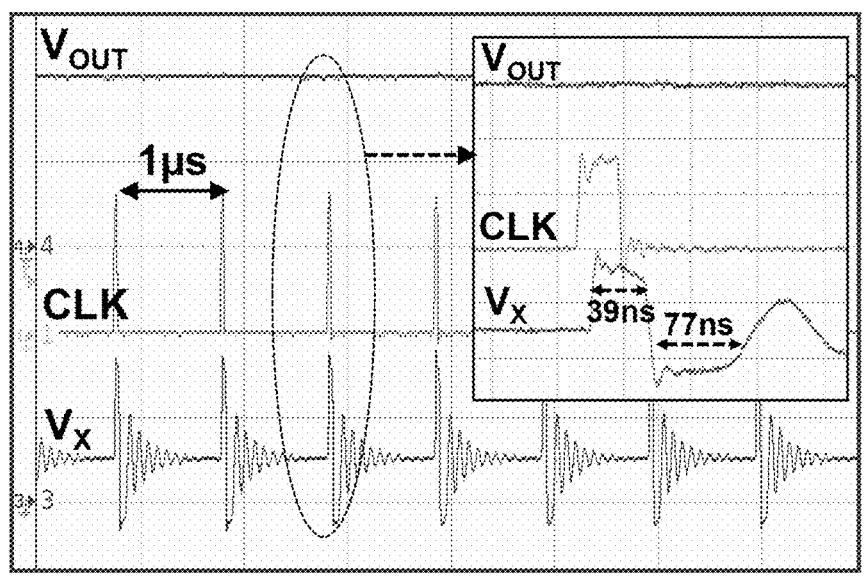
FIG. 19 is a graph illustrating measured steady-state response of VOUT and VX.

The transient response of $V_{OUT}$ by an abrupt output current change from 50 μA to 4 mA is shown in FIG. 18. Once the output is out of the voltage window, the mode arbiter unlocks the analog control, which is indicated with the mode arbiter start signal (lower trace in FIG. 18). As shown in the enlarged view in FIG. 18, the LCO is initially observed. After the mode arbiter kicks in, the LCO is suppressed and there is no oscillation in steady state. In the maximum current transient, the drop of $V_{OUT}$ is measured as about 240 mV. FIG. 19 shows the measured waveforms of inductor voltage ($V_X$), CLK, and $V_{OUT}$ when the converter is in steady state (governed by the fine analog control). The converter provides 900 μA output current from 3.3 V input supply. Again no steady state oscillation (LCO) has been observed in $V_{OUT}$. The on-times of the selected PMOS and NMOS transistors are 39 and 77 ns, respectively, and the ratio of two values is about 1.97. This number deviates from the ideal value of 2.3. However, we have not observed any significant power loss by reverse $I_L$. This is mainly because indirect ZCD is inherent in our architecture.

Figure 20:
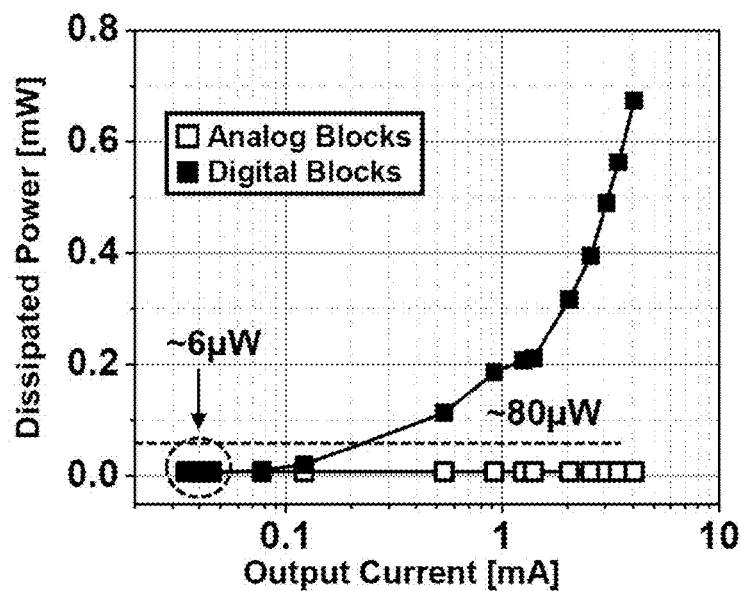
FIG. 20 is a graph illustrating power dissipation of analog and digital block.
Figure 21:
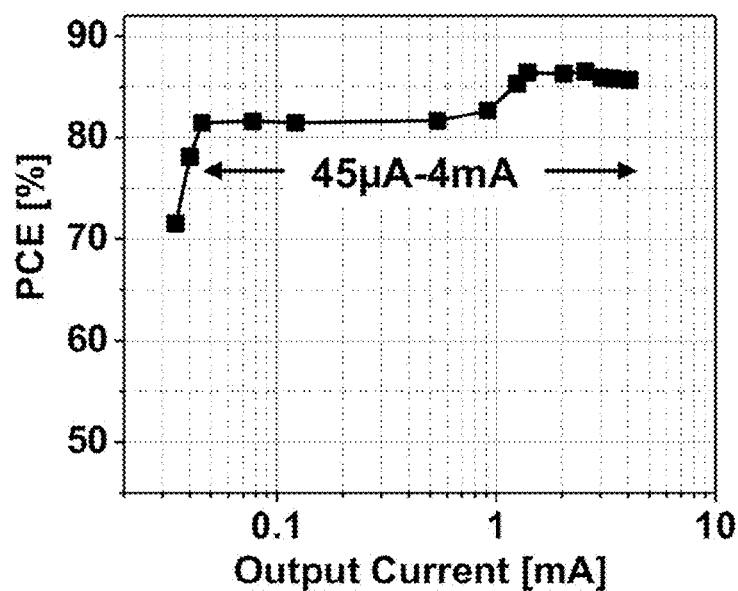
FIG. 21 is a graph illustrating measured power consumption efficiency at $V_{OUT}=1$ volt from $V_{IN}=3.3$ volt and $f_{SW}=0.96$ MHz.

FIG. 20 shows the measured power dissipation for analog and digital blocks, respectively, while sweeping the output current from 35 μA to 4.1 mA. The digital block only consumes about 6 μW at the lightest load ($I_{OUT}$=35 μA) which is larger than our initial estimation (~3 μW). For comparison, 80 μW horizontal line is drawn which is equivalent to the estimated SW loss when the size of power transistors is fixed at the maximum value ($W_P$=1.92 mm and $W_N$=1.2 mm). By adaptively adjusting the power transistor size, we can significantly reduce analog power consumption from 80 μW to 6 μW in the lightest loads. The improvement of PCE at the lightest load is estimated as 37%. The overall PCE is also measured from 3.3V nominal supply while sweeping the full range of $I_{OUT}$ as shown in FIG. 21. The measured PCE is 71% at 35 μA load current, however, it recovers and reaches to over 80% at 45 μA load current. The maximum PCE of 86.3% has been measured at 1.4 mA load current.

In this disclosure, a 1 MHz PWM buck converter is presented with the load-adaptive scaling of power transistors for implantable biomedical applications. For light loads, the size of power transistors has been dynamically adjusted by digital coarse control to prevent overdrive and enhance the efficiency. The error arising from the coarse adjustment is effectively compensated by analog fine control. The proposed buck converter is able to achieve a high PCE of larger than 80% in light loads of less than 100 μA, which is critical to elongate the lifetime of battery in implantable devices. Furthermore, due to its constant switching frequency, it does not generate any unpredictable output spurs. The fabricated buck converter has shown 71% efficiency at the minimum load of 35 μA and 86.3% peak efficiency at 1.4 mA. From 45 μA to 4.1 mA load conditions, it has achieved over 80% efficiency, generating 1 V output from a 3.3 V single supply. The converter occupies 0.375 mm2 in the active area using 0.18 μm standard CMOS processes. It only requires an external capacitor of 1.2 μF and an inductor of 6.8 μH. The proposed converter is suitable for implantable biomedical systems as well as other application that consume small currents most of time while requiring high energy efficiency and robust signal integrity.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power converter system, comprising:
a power converter configured to receive an input voltage and generate an output voltage that supplies a load, wherein the power converter is comprised of an array of converter circuits coupled in parallel to each other, each converter circuit includes at least one power transistor that regulates the magnitude of the output voltage; and
a controller configured to receive an indicator of the output voltage and interfaced with each power transistor in the array of converter circuits, wherein the controller selectively controls conductance through the power transistors in the array of converter circuits such that number of power transistors passing current to the load is proportional to the magnitude of the load,
wherein the controller determines an error signal by comparing the indicator of the output voltage with a reference voltage and generates drive signals for the power transistors in the array of converter circuits in accordance with one of a coarse control scheme or a fine control scheme, wherein the controller, during the coarse control scheme, determines the number of power transistors passing current to the load in accordance with the error signal and selectively controls conductance through the power transistors in the array of converter circuits in accordance with this determination
wherein the controller implements the coarse control scheme using
a compensator circuit configured to receive the error signal and compute a duty
cycle for the power converter in accordance with the error signal; and
a plurality of delay circuits configured to receive a pulsed input signal and output the drive signals for each power transistor in the array of converter circuits, wherein each delay circuit corresponds to one of the power transistors and adjusts the duty cycle of a drive signal for a corresponding power transistor in accordance with the computed duty cycle for the power converter.

2. The power converter system of claim 1 further comprises a mode arbiter configured to receive a signal indicative of the output voltage and extract information regarding the load using oscillation in the signal indicative of the output voltage.

3. The power converter system of claim 2 wherein the mode arbiter monitors magnitude of oscillation in the signal indicative of the output voltage and, in response to a determination that the magnitude of oscillation falls outside a predefined variance of the reference voltage, interacts with the controller to implement the coarse control scheme.

4. The power converter system of claim 3 wherein the mode arbiter, in response to a determination that the magnitude of oscillation falls within the predefined variance of the reference voltage, interacts with the controller to implement the fine control scheme.

5. The power converter system of claim 4 wherein the mode arbiter, in accordance with the fine control scheme, determines frequency of oscillations in the signal indicative of the output voltage during a fixed time period and computes an average duty cycle from the frequency of oscillations in the signal indicative of the output voltage.

6. The power converter system of claim 5 wherein the mode arbiter determines the frequency of oscillations by counting crossings of the reference voltage by the signal indicative of the output voltage.

7. The power converter system of claim 4 wherein the controller implements the fine coarse control scheme using an emulator configured to receive the input voltage and the output voltage, wherein the emulator generates driving currents for the plurality of delay circuits and adjusts the driving currents for one of the plurality of delay circuits in accordance with the fine control scheme.

8. The power converter system of claim 1 wherein the power converter is implemented as a buck converter.

9. A power converter system, comprising:
a power converter configured to receive an input voltage and generate an output voltage that supplies a load, wherein the power converter is comprised of an array of converter circuits coupled in parallel to each other, each converter circuit includes at least one power transistor that regulates the magnitude of the output voltage; and
a controller configured to receive an indicator of the output voltage and interfaced with each power transistor in the array of converter circuits, wherein the controller selectively controls conductance through the power transistors in the array of converter circuits such that number of power transistors passing current to the load is proportional to magnitude of the load, wherein the controller generates drive signals for the power transistors in the array of converter circuits in accordance with one of a coarse control scheme or a fine control scheme and
a mode arbiter configured to receive a signal indicative of the output voltage and extract information regarding the load using oscillation in the signal indicative of the output voltage, wherein the mode arbiter monitors magnitude of oscillation in the signal indicative of the output voltage and, in response to a determination that the magnitude of oscillation falls outside a predefined variance of a reference voltage, interacts with the controller to implement the coarse control scheme.

10. The power converter system of claim 9 wherein the controller determines an error signal by comparing the indicator of the output voltage with the reference voltage and generates drive signals for the power transistors in the array of converter circuits in accordance with one of a coarse control scheme or a fine control scheme, wherein the controller, during the coarse control scheme, determines the number of power transistors passing current to the load in accordance with the error signal and selectively controls conductance through the power transistors in the array of converter circuits in accordance with this determination.

11. The power converter system of claim 10 wherein the controller implements the coarse control scheme using
a compensator circuit configured to receive the error signal and compute a duty cycle for the power converter in accordance with the error signal; and
a plurality of delay circuits configured to receive a pulsed input signal and output the drive signals for each power transistor in the array of converter circuits, wherein each delay circuit corresponds to one of the power transistors and adjusts duty cycle of a drive signal for a corresponding power transistor in accordance with the computed duty cycle for the power converter.

12. The power converter system of claim 9 wherein the mode arbiter, in response to a determination that the magnitude of oscillation falls within the predefined variance of the reference voltage, interacts with the controller to implement the fine control scheme.

13. The power converter system of claim 12 wherein the mode arbiter, in accordance with the fine control scheme, determines frequency of oscillations in the signal indicative of the output voltage during a fixed time period and computes an average duty cycle from the frequency of oscillations in the signal indicative of the output voltage.

14. The power converter system of claim 13 wherein the mode arbiter determines the frequency of oscillations by counting crossings of the reference voltage by the signal indicative of the output voltage.

15. The power converter system of claim 12 wherein the controller implements the fine coarse control scheme using an emulator configured to receive the input voltage and the output voltage, wherein the emulator generates driving currents for the plurality of delay circuits and adjusts the driving currents for one of the plurality of delay circuits in accordance with the fine control scheme.

16. The power converter system of claim 9 wherein the power converter is implemented as a buck converter.

* * * * *